United States Patent
Marupaduga et al.

(10) Patent No.: US 11,051,312 B1
(45) Date of Patent: Jun. 29, 2021

(54) CONTROLLING CARRIER ASSIGNMENT BASED ON QUANTITIES OF RELAY-SERVED UES

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/360,465

(22) Filed: Mar. 21, 2019

(51) Int. Cl.
*H04W 72/04* (2009.01)
*H04L 5/00* (2006.01)

(52) U.S. Cl.
CPC ... *H04W 72/0486* (2013.01); *H04W 72/0426* (2013.01); *H04W 72/0453* (2013.01); *H04L 5/001* (2013.01)

(58) Field of Classification Search
CPC ..... H04L 5/001; H04L 5/0098; H04L 5/0094; H04W 72/042
See application file for complete search history.

(56) References Cited

U.S. PATENT DOCUMENTS

| | | |
|---|---|---|
| 7,480,486 B1 | 1/2009 | Oh et al. |
| 8,942,762 B1 | 1/2015 | Oroskar et al. |
| 9,226,210 B1 | 12/2015 | Saleh et al. |
| 9,253,662 B1 | 2/2016 | Marupaduga et al. |
| 10,149,207 B1 | 12/2018 | Oroskar et al. |
| 2011/0103277 A1 | 5/2011 | Watfa et al. |
| 2013/0196632 A1 | 8/2013 | Horn et al. |
| 2013/0315135 A1* | 11/2013 | Lee ......... H04L 5/0053 370/315 |
| 2013/0336201 A1* | 12/2013 | Nishio ........ H04W 16/26 370/315 |
| 2014/0003326 A1* | 1/2014 | Nishio ........ H04W 16/26 370/315 |
| 2014/0233529 A1 | 8/2014 | Prakash et al. |
| 2014/0301370 A1 | 10/2014 | Sivavakeesar |
| 2016/0234724 A1 | 8/2016 | Yang et al. |
| 2016/0295494 A1* | 10/2016 | Gulati ........... H04W 40/22 |
| 2016/0337282 A1 | 11/2016 | Kallio et al. |
| 2018/0035436 A1* | 2/2018 | Sharma ....... H04W 16/14 |
| 2018/0092121 A1* | 3/2018 | Hessler ....... H04W 72/1263 |
| 2018/0123683 A1* | 5/2018 | Wakabayashi ... H04B 7/15528 |
| 2019/0215781 A1* | 7/2019 | Jeon ............ H04W 24/10 |
| 2019/0364492 A1* | 11/2019 | Azizi ........... H04W 4/029 |
| 2020/0008127 A1* | 1/2020 | Ohtsuji ........ H04W 40/22 |
| 2020/0059821 A1* | 2/2020 | Wirth ........... H04L 5/0044 |

* cited by examiner

*Primary Examiner* — Asad M Nawaz
*Assistant Examiner* — Najeeb Ansari

(57) ABSTRACT

Disclosed is a mechanism to help control which of multiple carriers a base station will serve a UE on—perhaps which carrier should be the UE's primary component carrier for carrier-aggregation service. The disclosed mechanism can apply in a scenario where a base station is configured to provide service on multiple carriers including at least a first carrier and a second carrier, and when the base station is serving one or more relays respectively on each carrier. In that scenario, the selection of a carrier on which the base station should serve a UE could be made based at least on a consideration of how many UEs are served in total by the one or more relays that the base station serves respectively on each carrier, such as by selecting the carrier having the fewest such relay-served UEs.

18 Claims, 4 Drawing Sheets

CONTROLLING CARRIER ASSIGNMENT BASED ON QUANTITIES OF RELAY-SERVED UES

BACKGROUND

A typical wireless communication system includes one or more base stations, each radiating to define one or more coverage areas, such as cells and cell sectors, in which wireless client devices (UEs) such as cell phones, tablet computers, tracking devices, embedded wireless modules, and other wirelessly equipped communication devices (whether or not user operated), can operate. In turn, each base station could sit as a node on a core network that includes entities such as a network controller and a gateway system that provide packet-data-network connectivity. With this arrangement, a UE within coverage of the system could thus engage in air interface communication with a base station and thereby communicate via the base station with various remote network entities or with other UEs served by the system.

Such a network could operate in accordance with a particular radio access technology, with communications from the base stations to UEs defining a downlink or forward link and communications from the UEs to the base stations defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the radio access technology, each base station could be configured to operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

On the downlink and uplink, each such carrier could be structured to define various physical channels and air-interface resources for carrying information between the base stations and UEs. For instance, on the downlink, each carrier could define a reference channel on which the base station broadcasts a reference signal that UEs can evaluate to determine coverage strength, one or more downlink control channels for carrying control signaling from the base station to UEs, and one or more downlink traffic channels for carrying bearer communications from the base station to UEs. And on the uplink, each carrier could define one or more uplink control channels for carrying control signaling from UEs to the base station and one or more uplink traffic channels for carrying bearer communications from UEs to the base station.

When a UE initially powers on within such a system, the UE could scan various carriers in search of base station coverage, and upon detecting strong enough coverage, the UE could engage in signaling to establish a Radio Resource Control (RRC) connection with the base station and could then engage in an attach process if appropriate to register for service with the system and prepare the system to serve the UE.

In an example attach process, the UE could transmit an attach request over the air to the base station, and the base station could forward the attach request to the core-network controller for processing. And after authenticating and authorizing the UE, the network controller could then engage in signaling with the base station and with the gateway system, to coordinate establishment of a bearer (data tunnel) that that extends between the UE and the gateway system and defines an access point name (APN) connection associated with external transport-network connectivity. Further, a Dynamic Host Control Protocol (DHCP) server could assign to the UE an Internet Protocol (IP) address usable by the UE to engage in packet-data communication on the external transport network. And the base station and various core-network entities could each create and store a context record for the UE, identifying the UE's network connection, bearer identity, and other information to facilitate serving the UE.

Once a UE is so connected and attached, the base station could then provide the UE with wireless data communication service. For instance, when data arrives on the transport network destined to the UE's IP address, the gateway system could transmit the data via the UE's bearer to the base station, and the base station could then schedule downlink air interface resources to carry the data to the UE and transmit the data to the UE accordingly. Likewise, when the UE has data to transmit on the transport network, the UE could send a scheduling request to the base station, the base station could schedule uplink air interface resources to carry the data from the UE, and upon receipt of the data at the base station, the base station could then transmit the data via the UE's bearer to the gateway system for output onto the transport network.

Further, if the UE is within coverage provided by the base station on multiple carriers, the base station might provide the UE with carrier-aggregation service, serving the UE on multiple carriers at once, in which case one carrier on which the base station serves the UE could be deemed the UE's primary component carrier (PCC) and each other carrier on which the base station serves the UE could be deemed a secondary component carrier (SCC) of the UE. Depending on the implementation, the UE's PCC could be used for downlink and uplink communications and as the anchor for control signaling related to the carrier-aggregation service, whereas each added SCC might be used for just downlink communication to help increase the UE's peak downlink data rate.

OVERVIEW

Optimally, a wireless service provider will strategically implement base stations throughout a market area so that served UEs can move between the base stations' coverage areas without loss of coverage. Each base station could include an antenna structure and associated equipment, and the wireless service provider could connect each base station by a landline cable (e.g., a T1 line) with the service provider's core network, to enable the base station to communicate with the network controller, the gateway system, other base stations, and the like.

It may be impractical, however, for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or otherwise undesirable to run landline cables to every one of those small-cell base stations.

To provide coverage in these or other scenarios, the service provider could instead implement relays, each of which could be configured to operate in much the same way as a conventional landline-connected base station but could have a wireless backhaul connection to the core network. In particular, each relay could include a relay-base-station component configured to serve UEs much like a landline-connected base station would and a relay-UE component (e.g., connected with or integrated with the relay-base-station component) configured to be served by a landline-connected base station or other base station, referred to as a donor base station. The air interface between the relay-UE and the donor base station would thus define a wireless backhaul connection for the relay.

When the relay-UE component of a relay first powers on within the system, the relay-UE could operate in much the same way as the UE described above, scanning various carriers in search of base station coverage, and upon detecting strong enough coverage, engaging in signaling to connect with the base station. But because the relay-UE is a relay-UE rather than a conventional UE, the relay-UE could then engage in special attach processes through which the system would become configured to provide both the relay-UE and the associated relay-base-station with core-network connectivity through a dedicated core-network relay-gateway system.

For instance, the relay-UE could engage in a first attach process in which the relay-UE identifies itself as a relay-UE (such as by designating a special Public Land Mobile Network (PLMN) identifier or the like) that could result in (i) the core network establishing for the relay-UE of a first APN connection with the relay-gateway system and assigning to the relay-UE an internal-core-network IP address, and (ii) creation and storage at various core network entities of a context record for the relay-UE. And when each of one or more associated relay-base-station component powers on, the relay-UE could engage in another attach process that could result in the core network establishing for the relay-UE a second APN connection with the relay-gateway system, and assignment of an internal-core-network IP address for use by the relay-base-station.

Once a relay is so connected on at least one carrier with a serving donor base station, the relay-base-station component of the relay could then serve UEs in much the same way as a conventional base station would. But all associated control-plane and user-plane communications between the relay-base-station and the core network would flow over the wireless backhaul connection between the relay-UE and the donor base station.

For instance, whenever control signaling would flow from a core-network entity to the relay-base-station, that control signaling could flow via the relay-gateway system to the donor base station, the donor base station could coordinate transmission of that control-signaling as a bearer-data communication to the relay-UE on the relay-UE's serving carrier, and the UE-relay could then pass the communication to the relay-base station for processing. And whenever control signaling would flow from the relay-base station to a core-network entity, the relay-base station could pass that signaling as a bearer-data communication to the relay-UE, the donor base station could coordinate uplink transmission of that communication on the relay-UE's serving carrier, and the donor base station could pass the communication through the relay-gateway system to the destination core-network entity for processing.

And likewise, whenever the core-network gateway system receives data destined to the IP address of an end-user UE served by the relay-base-station, that data could flow via the relay-gateway system to the donor base station, the donor base station could coordinate transmission of the data to the relay-UE on the relay-UE's serving carrier, and the relay-UE could pass the data to the relay-base station, which can in turn schedule and provide downlink transmission of the data to the end-user UE. And whenever such an end-user UE has data to transmit on an external transport network, the relay-base-station could coordinate uplink transmission of that data from the end-user UE and could pass the data to the relay-UE, the donor base station could coordinate uplink transmission of that communication on the relay-UE's serving carrier, and the donor base station could pass the communication through the relay-gateway system to the conventional gateway system for output onto the transport network.

In a representative system like this, a base station could operate concurrently as both a donor base station serving one or more relays and as a conventional base station serving one or more conventional, non-relay UEs. Further, if the base station is configured to provide service on multiple carriers, the base station could serve one or more relays respectively on each such carrier, while concurrently serving one or more non-relay-UEs respectively on each carrier as well.

With such an arrangement, when a UE is within coverage of the base station on two or more carriers, the UE might connect with the base station on a carrier that the UE determines to be strongest and therefore the base station may serve the UE on that carrier. But at issue may be whether that carrier is the best choice to use for serving the UE. Further, the base station might configure carrier-aggregation service for the UE, and at issue in that situation might be which of the multiple carriers on which the base station serves the UE should be the UE's PCC.

Disclosed herein is a mechanism to help control which of multiple carriers a base station will serve a UE on—perhaps which carrier should be the UE's PCC for carrier-aggregation service. The disclosed mechanism can apply in a scenario where a base station is configured to provide service on multiple carriers including at least a first carrier and a second carrier, and when the base station is serving one or more relays respectively on each carrier.

In that scenario, the selection of a carrier on which the base station should serve a UE (perhaps which carrier should be the UE's PCC for carrier-aggregation service) will be made based at least on a consideration of how many UEs are served in total by the one or more relays that the base station serves respectively on each carrier. In particular, the base station could select between two carriers based on there being fewer UEs served in total by the one or more relays that the base station serves on the selected carrier than by one or more relays that the base station serves on the other carrier.

Having the base station serve a UE on a carrier selected based on there being fewer UEs served by the one or more relays that the base station serves on the selected carrier could be advantageous, as that carrier may experience less load than one or more other carriers on which the base station provides service. In particular, with fewer UEs served by the one or more relays that the base station serves on the selected carrier, the relay may have less associated control-plane and user-plane communications with the core network, which would translate to less associated communication being scheduled on that carrier between one or more relays and the core network. As a result, there could be greater capacity on the carrier to facilitate serving the UE at issue, which may help facilitate faster or otherwise improved service of the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will describe implementation in the context of LTE and/or 5G NR by way of example. It will be understood, however, that the principles disclosed can be applied in other contexts as well, such as in connection with other radio access technologies. Further, even within the context of LTE or 5G NR, it will be understood that variations are possible. For instance, elements and functions can be rearranged, reordered, omitted, added, combined, distributed, and/or otherwise modified. It will also be understood that technical operations disclosed as being carried out by one or more entities could be carried out at least in part by a processing unit programmed to carry out the operations or to cause one or more other entities to carry out the operations.

Figure 1:
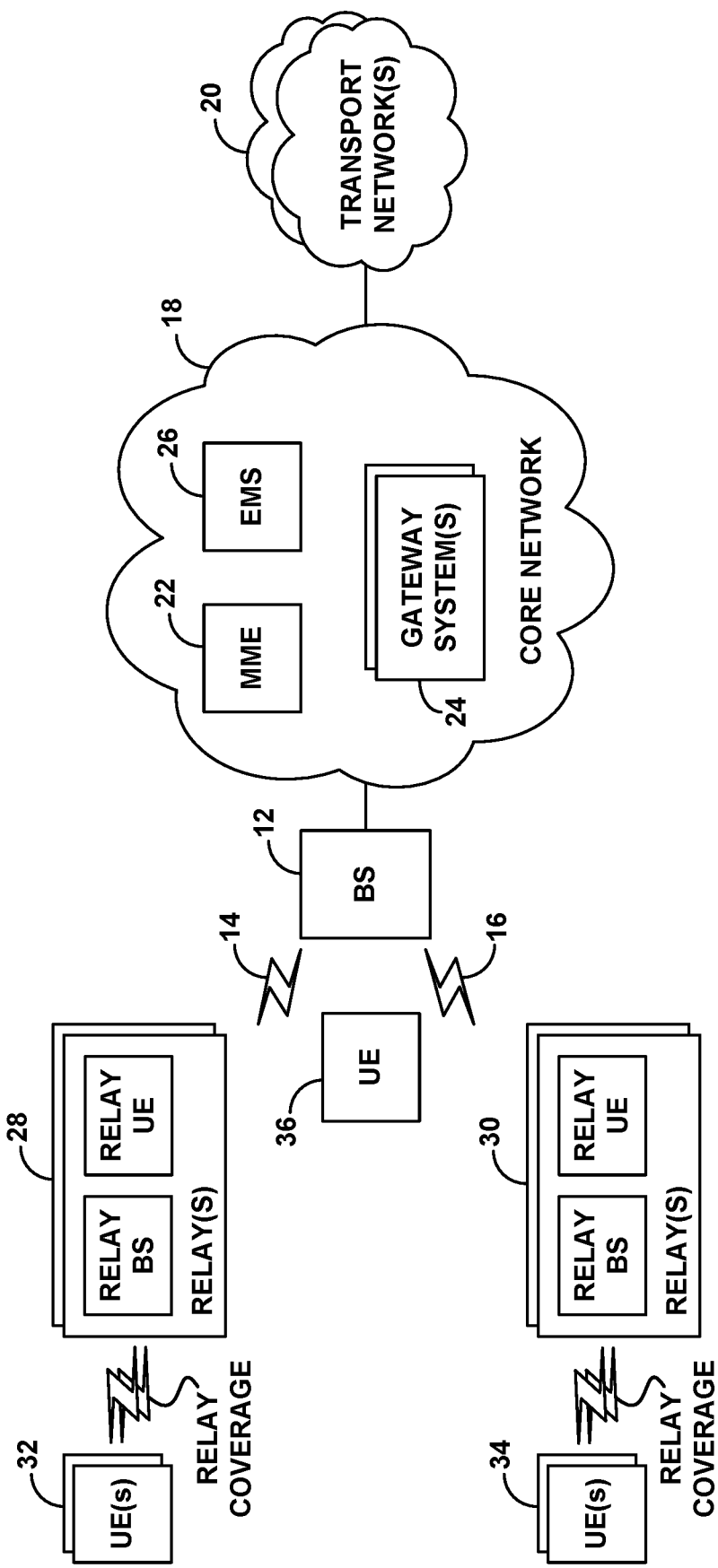
FIG. 1 is a simplified block diagram of a network arrangement in which aspects of the present disclosure can be implemented.

Referring to the drawings, as noted above, FIG. 1 is a simplified block diagram of an example wireless communication system in which various disclosed features can be implemented. As shown, the example system includes a base station 12 configured to provide service on at least two representative carriers 14, 16. The base station might provide service on both of these carriers in a common coverage area, so that UEs could be in coverage of the base station on both carriers at once, depending on path loss and other factors. Further, the base station could take various forms, including without limitation a macro base station or a small cell base station, among other possibilities, including an antenna structure and associated base station components or equipment.

As further shown, the base station 12 is interfaced with an example core access network 18 that is in turn interfaced with one or more external transport networks 20. The core network could be a packet-switched network, such as an Evolved Packet Core (EPC) network or a Next Generation Core (NGC) network, among other possibilities, through which entities could communicate with each other over packet-based tunnels or the like.

By way of example, the core network is shown including a Mobility Management Entity (MME) 22, gateway systems 24, and an element management system 26. MME 22 could function as a core-network controller, to facilitate coordinating UE attachment and setup of bearers, paging of UEs, among other possibilities. Gateway systems 24 could include a conventional gateway system, which could comprise a serving gateway (SGW) and packet-data-network gateway (PGW) (neither shown) for cooperatively providing served UEs with external transport-network connectivity, and a relay-gateway system, which could likewise comprise an SGW and PGW for cooperatively providing served relays with internal core-network connectivity. And EMS 26 could function to receive operational-state reports from various network elements and to store information about such operational state for various purposes.

In an example implementation, each of the multiple carriers 14, 16 on which base station 12 is configured to provide service would have a defined carrier bandwidth and center frequency, possibly separately for downlink and uplink channels. And in accordance with the radio access technology, the air interface on the carrier could be structured to define various air-interface resources to facilitate carrying information between the base station and UEs.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier could be divided into subcarriers with specified subcarrier spacing on the order of 15 to 240 kHz. With this arrangement, the air interface on each carrier would thus define an array of resource elements each occupying a subcarrier and symbol time segment, and the base station and UEs could be configured to communicate with each other through modulation of the subcarriers to carry data in those resource elements.

Further, particular sets of resource elements on the air interface could be grouped together to define the physical resource blocks (PRBs). In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs. Further, in certain subframes, particular resource elements could be reserved for other purposes, such as to carry synchronization signals that UEs could detect as a way to discover coverage of the base station on the carrier and to establish frame timing. And other resource elements distributed in a predefined pattern throughout the carrier bandwidth per subframe could be reserved to carry reference signals that UEs could measure as a basis to evaluate coverage strength.

And on the uplink, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

Details of the air interface could differ depending on the radio access technology. For instance, as between 4G LTE and 5G NR, one may provide variable subcarrier spacing but the other may provide fixed subcarrier spacing, one may have different symbol time segments than the other, and one may make use of different MIMO technologies than the other. Further, with TDD carriers, one may have a flexible TDD configuration and the other may have a fixed TDD configuration. Other examples are possible as well.

In line with the discussion above, when any UE enters into coverage of base station 12, the UE could scan for coverage on various carriers (e.g., at predefined center frequencies) and upon detecting such coverage on one or more carriers could evaluate the reference signal per carrier to determine coverage strength (e.g., reference signal receive power (RSRP) and/or reference signal receive quality (RSRQ)). The UE could then select a carrier, such as the one having the greatest determined coverage strength. And the UE could engage in random access signaling and RRC signaling to connect with the base station, thus putting the UE in an RRC-connected mode.

In addition, once the UE is connected with the base station, the UE could then engage in attach signaling via the base station with the MME. And as discussed above, the MME could coordinate setup for the UE of bearer and APN connectivity between the UE and the gateway system. Further, the base station could coordinate establishment for the UE of a corresponding data radio bearer between the UE and the base station, and the base station could record the operational state of the UE in a context record for the UE.

As discussed above, the base station could then serve the UE with data communications as discussed above.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

And when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

In addition, the base station could configure carrier-aggregation service for the UE. For instance, the base station could direct the UE to scan for secondary coverage and could receive in response from the UE a report that the UE detected threshold strong coverage from the base station on another carrier. The base station could then deem the UE's currently serving carrier to be the UE's PCC and could add the other carrier to the UE's RRC connection as an SCC. In particular, the base station could transmit to the UE an RRC connection-reconfiguration message that designates the UE's currently serving carrier as PCC and that designates the other carrier as SCC, and the base station and UE could update their records to indicate that the UE is being served on those two carriers concurrently.

With carrier-aggregation service so configured, the base station could then serve the UE with data communications on the combination of carriers. In this process, as noted above, the UE's PCC might be used for downlink and uplink communication and as the anchor for control signaling, whereas the UE's SCC might be used for just downlink bearer communication. For instance, scheduling requests and DCI signaling might occur on just the PCC, with the base station scheduling use of PRBs on both carriers.

In a representative scenario in accordance with the present disclosure, base station 12 is shown serving one or more relays respectively on each of carriers 14, 16. In particular, the base station is shown serving one or more relays 28 on carrier 14 and serving one or more relays 30 on carrier 16. As shown, each relay could include a relay-base-station (relay BS) component and a relay-UE component. For each relay, these components could be integrated together or could be provided separately and interconnected together.

These relay components could operate as discussed above. For instance, the relay-UE component of a relay could connect with the base station on a carrier and could engage in attachment to acquire internal core-network APN connectivity for both itself and its associated relay-base-station component. And the relay-base-station component could operate much like any other base station would, providing relay coverage in which to serve UEs. Thus, relay(s) 28, connected with base station 12 on carrier 14, might be serving one or more UEs 32. And relay(s) 30, connected with base station 12 on carrier 16, might be serving one or more UEs 34.

Further, in the representative scenario, a UE 36 could be within coverage of base station 12 on both carriers 14 and 16. And in accordance with the present disclosure, at issue may be which of those carriers the base station should serve the UE on—perhaps which of the carriers should be the UE's PCC.

For instance, UE 36 may be connected with the base station on one of the base station's carriers, and at issue may be whether the base station should continue to serve the UE on that carrier or should rather transition from serving the UE on that carrier to serving the UE instead on the other carrier. Or in the context of carrier aggregation, if the base station is serving or is going to serve the UE on both of the carriers concurrently, at issue may be which of the carriers should be the UE's PCC.

As noted above, the base station could resolve this issue based at least in part on a consideration, per carrier, of how many UEs are served by the one or more relays that the base station serves on the carrier. In particular, the base station could consider per carrier how many UEs in total are RRC-connected with the one or more relays that the base station serves on the carrier. Thus, for carrier 14, the base station could consider how many UEs 32 in total are currently connected with the one or more relays 28 that the base station serves on carrier 14. And for carrier 16, the base station could consider how many UEs 34 in total are currently connected with the one or more relays 30 that the base station serves on carrier 16.

For each carrier, base station 12 could determine in various ways how many UEs are served by the one or more relays that the base station serves on the carrier.

By way of example, respectively for each carrier, the base station could consult its UE-context records to determine which of one or more UEs that are currently connected with the base station are relay-UEs, as may have been indicated by special UE identifiers included in connection signaling and/or attachment signaling as noted above. The base station could then engage in RRC signaling with each such relay-UE to inquire how many UEs are currently connected with the relay-UE's associated relay-base-base station. And the relay-UE could engage in signaling with the relay-base-station to find out how many UEs are currently connected with the relay-base-station and could report that quantity in response to base station 12.

Alternatively, the base station could more directly engage in inter-base-station signaling with the relay-base-station component respectively of each relay that the base station serves on the carrier. For instance, for each relay-UE that the base station serves on the carrier, the base station could query the MME 22, gateway system 24, or EMS 26 to determine the IP address of the associated relay-base-station. Or the base station may have ascertained the relay-base-station's IP address through the relay-UE's attach signaling with the MME or in another manner. The base station could thus engage in IP communication with the relay-base-station (perhaps via the relay-gateway system) to find out how many UEs are currently connected with the relay-base-station.

Still alternatively, the base station could query EMS 26 or another such entity. In an example implementation, each relay-base-station could report to the EMS 26 when UEs become connected with the relay-base-station or released from the relay-base station, and the EMS could maintain associated records. Further, those records could be correlated with associated relay-UE identifiers. Thus, for each relay-UE that the base station serves on the carrier, the base station could query the EMS to find out how many UEs are currently connected with the associated relay-base-station.

If the base station serves just one relay on a carrier, then the count of UEs currently served by that relay could be the total number of UEs served by the relay that the base station serves on that carrier. Whereas, if the base station serves multiple relays on a carrier, then the base station could sum its determined counts per relay to determine the cumulative total number of UEs served by the relays that the base station serves on that carrier.

To decide which carrier to serve UE 36 on, the base station could then compare the various quantities of UEs served in total by the one or more relays that the base station serves respectively on each carrier. And the base station could select a carrier on which to serve the UE based on a determination that there are fewer UEs served by the one or more relays that the base station serves on that selected carrier than by the one or more relays that the base station serves on another carrier.

For instance, the base station might thereby determine that the one or more relays 28 that the base station serves on carrier 14 currently serve a total quantity $Q_{14}$ of UEs 32 and that the one or more relays 30 that the base station serves on carrier 16 currently a total quantity $Q_{16}$ of UEs 34. And the base station could then compare quantities $Q_{14}$ and $Q_{16}$ and thereby determine that quantity $Q_{14}$ is less than quantity $Q_{16}$.

And based at least on this determination, the base station could decide to serve UE 36 on carrier 14 rather than on carrier 16, or that, for carrier-aggregation service, the UE's PCC should be carrier 14 rather than carrier 16.

Note that the base station could also take into account additional factors in deciding which carrier to serve UE 36 on. For example, the base station could also take into account the load respectively on each carrier, such as the percent PRB utilization and/or the number of UEs (of any type) that the base station serves on the carrier.

In an example implementation, for instance, the base station might first compare the carriers' load. And if one carrier is substantially less loaded than the other, the base station may choose that carrier to use for serving the UE. Whereas, if the base station determines that both the carriers are roughly equally loaded, then the base station might then turn to the question of which carrier has fewer UEs served by the one or more relays that the base station serves on the carrier, in order to decide which carrier to serve the UE on or to use as the UE's PCC. Other examples are possible as well.

And in another example implementation, the base station might determine that a second one of the base station's carriers is predefined threshold highly loaded, and the base station might decide to serve the UE 36 on a first one of the base station's carriers rather than on the second carrier, based on, or response to, the combined factors of (i) the determination that the second carrier is threshold highly loaded and (ii) the determination that there are fewer UEs served by one or more relays that the base station serves on the first carrier than by the one or more relays that the base station serves on the second carrier.

In practice, when the base station carries out the present process, the UE might already be connected with the base station on one carrier, and through the process the base station may decide whether to continue serving the UE on that carrier or rather to transfer the UE to the other carrier and may proceed accordingly.

For instance, in a scenario where the base station decides to serve the UE on carrier 14, the UE might already be connected with the base station on carrier 14, and so the base station could therefore decide to maintain the UE on that carrier rather than transferring the UE to be served on carrier 16 and could proceed accordingly. Alternatively, in a scenario where the base station decides to serve the UE on carrier 14, the UE might currently be connected with the base station on carrier 16, and so the base station could decide to transfer the UE from being served on carrier 16 to being served instead on carrier 14. To do so, the base station could transmit to the UE an RRC connection-reconfiguration message that directs the UE to operate instead on carrier 14, and the base station and UE could update their context records and proceed accordingly.

Analogously, with carrier-aggregation service, the UE might already be connected with the base station on one or both carriers and one of the carriers might be the UE's PCC or only serving carrier. And through the present process, the base station could decide whether that carrier should be the UE's PCC or the other carrier should be the UE's PCC.

For instance, in a scenario where the base station decides carrier 14 should be the UE's PCC for carrier-aggregation service, the UE might already have carrier 14 as its PCC or only serving carrier, and the base station may therefore decide to maintain or establish designation of that carrier as the UE's PCC for carrier-aggregation service. Alternatively, in a scenario where the base station decides carrier 14 should be the UE's PCC for carrier-aggregation service, the UE might currently have carrier 16 as its PCC or be connected with the base station only on carrier 16, and so the base station could configure carrier-aggregation service of the UE as desired. For instance, the base station could transmit to the UE an RRC connection-reconfiguration message specifying carrier 14 as the UE's PCC and carrier 16 as an SCC of the UE, and the base station and UE could update their context records and proceed accordingly.

Note also that while the above discussion focuses on an implementation with two carriers, similar principles could be applied with more than two carriers. Further, while the above discussion addresses a scenario where each relay includes a respective relay-base-station component that could serve UEs, similar principles could be applied where a given relay includes multiple relay-base-stations that could serve UEs, in which case the cumulative total number of served UEs could include those served in total by the relay's relay-base-stations.

Still further, note that the above principles could be applied in the context of dual-connectivity on multiple radio access technologies. For instance, a representative cell site might include both base station 12 that provides service on multiple carriers according to a first radio access technology such as 4G LTE, and another base station that provides service on at least one carrier according to a second radio access technology such as 5G NR. In that arrangement, UE 36 might be configured to support EUTRA-NR Dual Connectivity (EN-DC) service on 4G and 5G, with 4G providing a master RRC connection for the UE on one or more 4G carriers and 5G providing a concurrent secondary RRC connection for the UE on at least one 5G carrier. The above-discussed principles could apply in that context to help ensure that the UE is connected on an optimal 4G carrier, or with an optimal 4G carrier being the UE's PCC for 4G carrier-aggregation service, so as to help support optimal EN-DC service.

Figure 2:
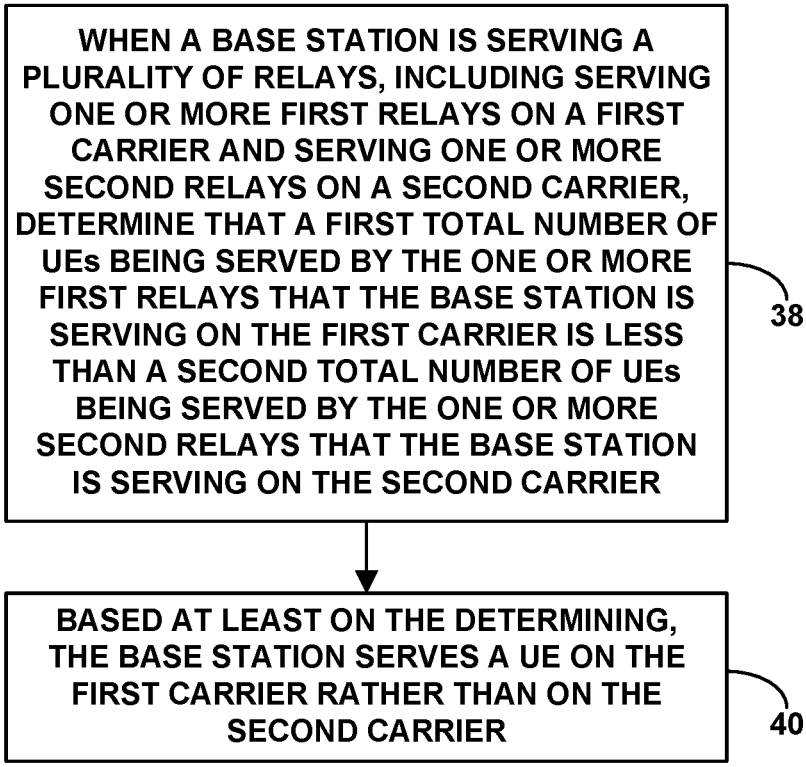
FIG. 2 is a flow chart depicting functions that can be carried out in accordance with the present disclosure.

FIG. 2 is a flow chart depicting a method that could be carried out in accordance with the present disclosure, to control which of a plurality of carriers a base station will serve a UE on, the base station being configured to provide service on at least two carriers including a first carrier and a second carrier.

As shown in FIG. 2, at block 38, the method includes, when the base station is serving a plurality of relays, including serving one or more first relays on the first carrier and serving one or more second relays on the second carrier, the base station determining that a first total number of UEs being served by the one or more first relays that the base station is serving on the first carrier is less than a second total number of UEs being served by the one or more second relays that the base station is serving on the second carrier. And at block 40, the method includes, based at least on the determining, the base station serving the UE on the first carrier rather than on the second carrier.

In line with the discussion above, the act of the base station determining that the first total number of UEs being served by the one or more first relays that the base station is serving on the first carrier is less than the second total number of UEs being served by the one or more second relays that the base station is serving on the second carrier could involve (i) determining the first total number of UEs being served by the one or more first relays that the base station is serving on the first carrier, (ii) determining the second total number of UEs being served by the one or more second relays that the base station is serving on the second carrier, (iii) comparing the determined first total with the determined second total, and (iv) based on the comparing, determining that the first total is less than the second total.

Further, as discussed above, the determining could involve the base station querying each relay of the plurality of relays to determine how many UEs are connected respectively with the relay, such as querying a relay-UE component of each relay and/or querying a relay-base-station component of each relay, and/or querying a core-network EMS to determine how many UEs are connected respectively with each relay.

Still further, as discussed above, the determining could be carried out when the UE is connected with the base station on the second carrier. And in that case, the act of serving the UE on the first carrier rather than on the second carrier could involve (i) transmitting from the base station to the UE a reconfiguration message directing the UE to transition from being connected with the base station on the second carrier to being connected with the base station on the first carrier and (ii) updating a UE-context record at the base station to indicate that the base station is serving the UE on the first carrier.

Alternatively, as discussed above, the determining could be carried out when the UE is connected with the base station on the first carrier. And in that case, the act of serving the UE on the first carrier rather than on the second carrier could involve maintaining connection of the UE with the base station on the first carrier, e.g., rather than transition in the UE from the first carrier to the second carrier.

Yet further, as discussed above, the method could additionally include the base station determining that a level of load on the second carrier is predefined threshold high. And in that case, the act of serving the UE on the first carrier rather on the second carrier could be additionally based on the determining that the level of load on the second carrier is predefined threshold high.

Figure 3:
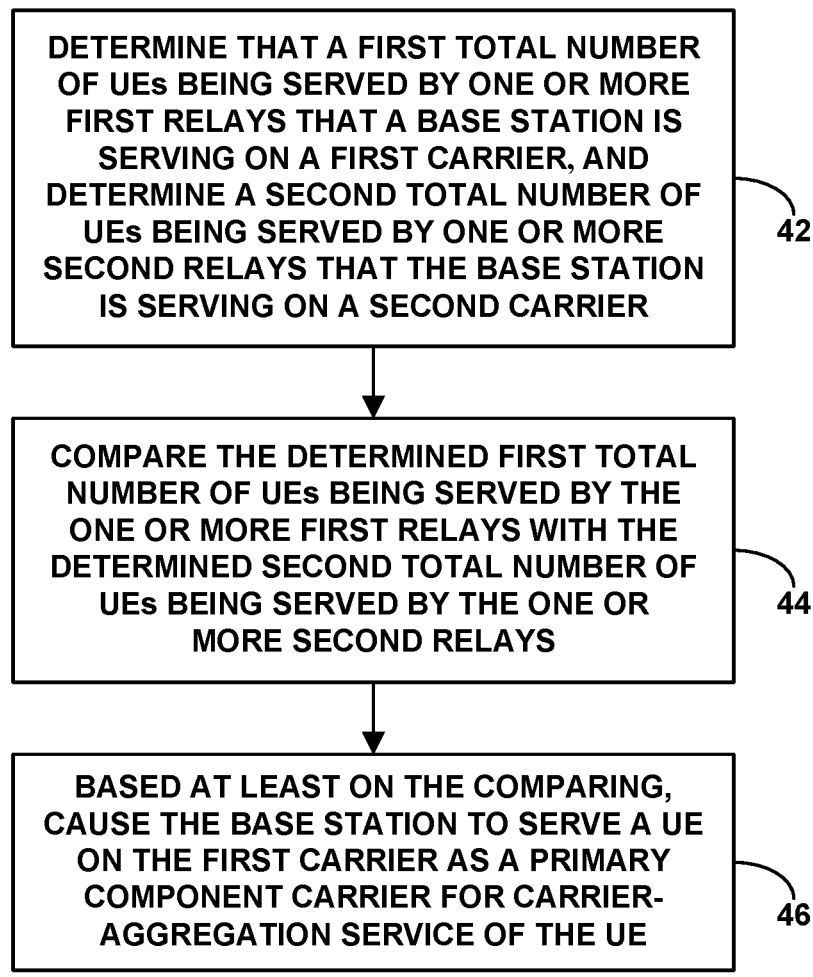
FIG. 3 is another flow chart depicting functions that can be carried out in accordance with the present disclosure.

FIG. 3 is a flow chart depicting a method that could be carried out in accordance with the present disclosure, to control which of a plurality of carriers a base station will serve a user UE on as a PCC for carrier-aggregation service of the UE, the base station being configured to provide service on at least two carriers including a first carrier and a second carrier. The method of claim 3 could likewise be carried out when the base station is serving one or more first relays on a first carrier and is serving one or more second relays on a second carrier.

As shown in FIG. 3, at block 42, the method includes determining a first total number of UEs being served by the one or more first relays that the base station is serving on the first carrier and determining a second total number of UEs being served by the one or more second relays that the base station is serving on the second carrier. And at block 44, the method includes comparing the determined first total number of UEs being served by the one or more first relays with the determined second total number of UEs being served by the one or more second relays. At block 46, the method then includes, based at least on the comparing, causing the base station to serve the UE on the first carrier as the PCC for carrier-aggregation service of the UE.

In line with the discussion above, the carrier-aggregation service of the UE could be over a master wireless connection in accordance with a first radio access technology (e.g., 4G LTE) and could be concurrent with the UE being served over a secondary wireless connection in accordance with a second radio access technology (e.g., 5G NR).

Further, as discussed above, the act of causing the base station to serve UE on the first carrier as the PCC for the carrier-aggregation service of the UE could involve causing the base station to provide the UE with the carrier-aggregation service of the UE on a combination of carriers including (i) the first carrier as the PCC for the carrier-aggregation service of the UE and (ii) the second carrier as a secondary component carrier (SCC) for the carrier-aggregation service of the UE.

For instance, the base station could transmit to the UE a reconfiguration message directing the UE to operate with the first carrier as the UE's PCC for the carrier-aggregation service and with the second carrier as an SCC for the carrier-aggregation service, and the base station could update a UE-context record at the base station to indicate that the first carrier is the PCC for the carrier-aggregation service of the UE and that the second carrier is an SCC for the carrier-aggregation service of the UE.

Figure 4:
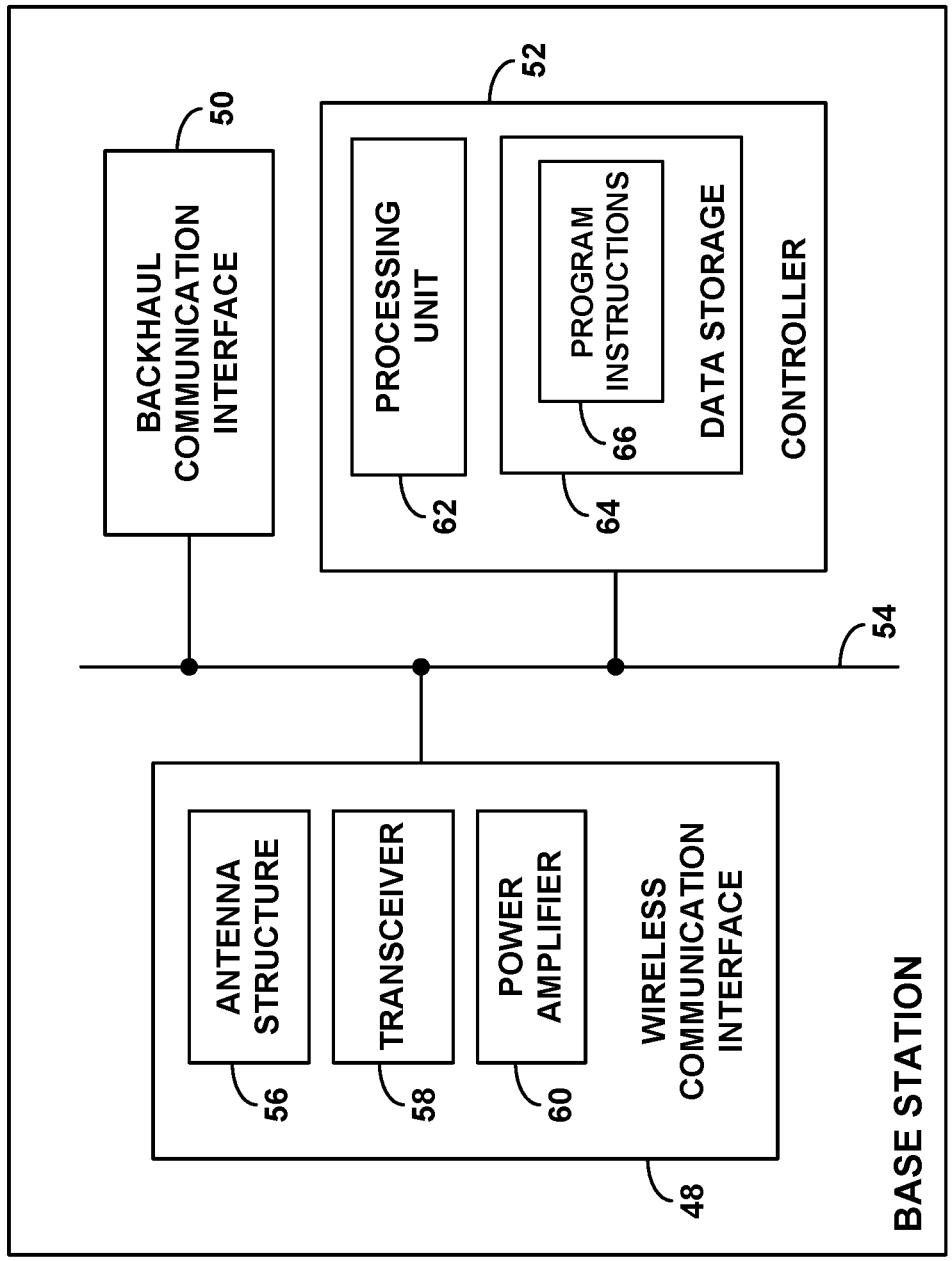
FIG. 4 is a simplified block diagram of a base station operable in accordance with the disclosure.

Finally, FIG. 4 is a simplified block diagram of an example base station operable in line with the discussion above. As shown, the example base station includes a wireless communication interface 48, a backhaul communication interface 50, and a controller 52, which could be integrated or communicatively linked together by a system bus, network, or other connection mechanism 54 and/or could be integrated together or distributed in various ways.

The wireless communication interface 48 could include an antenna structure (e.g., a MIMO antenna array, possibly a massive-MIMO array) 56, a transceiver 58, and a power amplifier 60, among one or more other RF components, to cooperatively facilitate air interface communication with UEs served by the base station. Thus, through the wireless communication interface including the antenna structure, the base station could be configured to provide coverage and service on a representative radio access technology as described above.

The backhaul communication interface 50 could include a wireless and/or wireless network communication module configured to support communication with various core-network entities as discussed above.

And the controller 52 could be configured to carry out various base station operations described herein. For instance, the controller could comprise a processing unit 62 including one or more processors (e.g., general purpose microprocessors and/or dedicated processing units), non-transitory data storage 64 (e.g., one or more volatile and/or non-volatile storage components, such as magnetic, optical or flash storage), and program instructions 66 stored in the non-transitory data storage and executable by the processing unit 62 to cause the base station to carry out the operations.

By way of example, the controller 52 could be configured to control which of the plurality of carriers the base station will serve a UE on when the base station is serving a plurality of relays, including serving one or more first relays on the first carrier and serving one or more second relays on the second carrier. In line with the discussion above, controller could thus be configured to make a determination that a first total number of UEs being served by the one or more first relays that the base station is serving on the first carrier is less than a second total number of UEs being served by the one or more second relays that the base station is serving on the second carrier. And the controller could be configured to cause the base station to serve the UE on the first carrier rather than on the second carrier responsive to at least the determination that the first total number of UEs being served by the one or more first relays that the base station is serving on the first carrier is less than the second total number of UEs being served by the one or more second relays that the base station is serving on the second carrier.

Various features described above can be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling which of a plurality of carriers a base station will serve a user equipment device (UE) on, wherein the base station is configured to provide service on at least two carriers including a first carrier and a second carrier, the method comprising:

when the base station is serving a plurality of relays, including serving one or more first relays on the first carrier and serving one or more second relays on the second carrier, determining by the base station that a first total number of UEs being served by the one or more first relays that the base station is serving on the first carrier is less than a second total number of UEs being served by the one or more second relays that the base station is serving on the second carrier, wherein determining by the base station that the first total number of UEs being served by the one or more first relays that the base station is serving on the first carrier is less than the second total number of UEs being served by the one or more second relays that the base station is serving on the second carrier includes (i) determining by the base station the first total number of UEs being served by the one or more first relays that the base station is serving on the first carrier, (ii) determining by the base station the second total number of UEs being served by the one or more second relays that the base station is serving on the second carrier, (iii) comparing by the base station the determined first total with the determined second total, and (iv) based on the comparing, determining that the first total is less than the second total; and based at least on the determining that the first total number of UEs being served by the one or more first relays that the base station is serving on the first carrier is less than the second total number of UEs being served by the one or more second relays that the base station is serving on the second carrier, serving by the base station the UE on the first carrier rather than on the second carrier.

2. The method of claim 1, wherein the determining that the first total number of UEs being served by the one or more first relays that the base station is serving on the first carrier is less than the second total number of UEs being served by the one or more second relays that the base station is serving on the second carrier comprises:

querying each relay of the plurality of relays to determine how many UEs are connected respectively with the relay.

3. The method of claim 1, wherein the determining that the first total number of UEs being served by the one or more first relays that the base station is serving on the first carrier is less than the second total number of UEs being served by the one or more second relays that the base station is serving on the second carrier comprises:

querying a core-network element-management system to determine how many UEs are connected respectively with each relay.

4. The method of claim 1, wherein the determining that the first total number of UEs being served by the one or more first relays that the base station is serving on the first carrier is less than the second total number of UEs being served by the one or more second relays that the base station is serving on the second carrier is carried out when the UE is connected with the base station on the second carrier, and wherein serving the UE on the first carrier rather than on the second carrier comprises (i) transmitting from the base station to the UE a reconfiguration message directing the UE to transition from being connected with the base station on the second carrier to being connected with the base station on the first carrier and (ii) updating a UE-context record at the base station to indicate that the base station is serving the UE on the first carrier.

5. The method of claim 1, wherein the determining that the first total number of UEs being served by the one or more first relays that the base station is serving on the first carrier is less than the second total number of UEs being served by the one or more second relays that the base station is serving on the second carrier is carried out when the UE is connected with the base station on the first carrier, and wherein serving the UE on the first carrier rather than on the second carrier comprises maintaining connection of the UE with the base station on the first carrier.

6. The method of claim 1, further comprising:

determining, by the base station, that a level of load on the second carrier is predefined threshold high, wherein the serving the UE on the first carrier rather on the second carrier is additionally based on the determining that the level of load on the second carrier is predefined threshold high.

7. A method for controlling which of a plurality of carriers a base station serves a user equipment device (UE) on as a primary component carrier (PCC) for carrier-aggregation service of the UE, the method comprising:

when the base station is serving one or more first relays on a first carrier and is serving one or more second relays on a second carrier, (i) determining a first total number of UEs being served by the one or more first relays, (ii) determining a second total number of UEs being served by the one or more second relays, (iii) comparing the determined first total number of UEs being served by the one or more first relays with the determined second total number of UEs being served by the one or more second relays, and (iv) based at least on the comparing, determining that the first total number of UEs being served by the one or more first relays is less than the second total number of UEs being served by the one or more second relays that the base station is serving on the second carrier, and (v) based at least on the determining that the first total number of UEs being served by the one or more first relays that the base station is serving on the first carrier is less than the second total number of UEs being served by the one or more second relays that the base station is serving on the second carrier, causing the base station to serve the UE on the first carrier as the PCC for carrier-aggregation service of the UE.

8. The method of claim 7, wherein the carrier-aggregation service of the UE is over a master wireless connection in accordance with a first radio access technology and is concurrent with the UE being served over a secondary wireless connection in accordance with a second radio access technology.

9. The method of claim 8, wherein the master wireless connection is a 4G LTE connection, and wherein the secondary wireless connection is a 5G NR connection.

10. The method of claim 8, wherein causing the base station to serve UE on the first carrier as the PCC for the carrier-aggregation service of the UE comprises:

causing the base station to provide the UE with the carrier-aggregation service of the UE on a combination of carriers including (i) the first carrier as the PCC for the carrier-aggregation service of the UE and (ii) the second carrier as a secondary component carrier (SCC) for the carrier-aggregation service of the UE.

11. The method of claim 10, wherein causing the base station to serve the UE on the first carrier as the PCC for the carrier-aggregation service and the second carrier as the SCC for the carrier-aggregation service of the UE comprises:

transmitting from the base station to the UE a reconfiguration message directing the UE to operate with the first carrier as the PCC for the carrier-aggregation service and with the second carrier as an SCC for the carrier-aggregation service; and updating a UE-context record at the base station to indicate that the first carrier is the PCC for the carrier-aggregation service of the UE and that the second carrier is an SCC for the carrier-aggregation service of the UE.

12. A base station comprising:

a wireless communication interface through which the base station is configured to provide service on at least two carriers including a first carrier and a second carrier; and a controller configured to control which of the plurality of carriers the base station will serve a user equipment device (UE) on when the base station is serving a plurality of relays, including serving one or more first relays on the first carrier and serving one or more second relays on the second carrier, wherein the controller is configured to make a determination that a first total number of UEs being served by the one or more first relays that the base station is serving on the first carrier is less than a second total number of UEs being served by the one or more second relays that the base station is serving on the second carrier, wherein determining that the first total number of UEs being served by the one or more first relays that the base station is serving on the first carrier is less than a second total number of UEs being served by the one or more second relays that the base station is serving on the second carrier includes (i) determining the first total number of UEs being served by the one or more first relays that the base station is serving on the first carrier, (ii) determining the second total number of UEs being served by the one or more second relays that the base station is serving on the second carrier, (iii) comparing the determined first total with the determined second total, and (iv) based on the comparing, determining that the first total is less than the second total, and wherein the controller is configured to cause the base station to serve the UE on the first carrier rather than on the second carrier responsive to at least the determination that the first total number of UEs being served by the one or more first relays that the base station is serving on the first carrier is less than the second total number of UEs being served by the one or more second relays that the base station is serving on the second carrier.

13. The base station of claim 12, wherein the controller comprises a processing unit, non-transitory data storage, and program instructions stored in the non-transitory data storage and executable by the processing unit.

14. The base station of claim 12, wherein making the determination that the first total number of UEs being served by the one or more first relays that the base station is serving on the first carrier is less than the second total number of UEs being served by the one or more second relays that the base station is serving on the second carrier comprises:
  querying each relay of the plurality of relays to determine how many UEs are connected respectively with the relay.

15. The base station of claim 12, making the determination that the first total number of UEs being served by the one or more first relays that the base station is serving on the first carrier is less than the second total number of UEs being served by the one or more second relays that the base station is serving on the second carrier comprises:
  querying a core-network element-management system to determine how many UEs are connected respectively with each relay.

16. The base station of claim 12,
  wherein the controller makes the determination when the UE is connected with the base station on the second carrier, and
  wherein causing the base station serve the UE on the first carrier rather than on the second carrier comprises causing the base station to (i) transmit to the UE a reconfiguration message directing the UE to transition from being connected with the base station on the second carrier to being connected with the base station on the first carrier and (ii) update a UE-context record at the base station to indicate that the base station is serving the UE on the first carrier.

17. The base station of claim 12,
  wherein the controller makes the determination when the UE is connected with the base station on the first carrier, and
  wherein causing the base station to serve the UE on the first carrier rather than on the second carrier comprises maintaining connection of the UE with the base station on the first carrier.

18. The base station of claim 12,
  wherein the controller is further configured to determine that a level of load on the second carrier is predefined threshold high, and
  wherein causing the base station to serve the UE on the first carrier rather than on the second carrier is further responsive to the determining that the level of load on the second carrier is predefined threshold high.

* * * * *